July 31, 1962    H. E. RIORDAN    3,046,793
HYDRAULIC AVERAGING ACCELEROMETER
Filed April 4, 1960    3 Sheets-Sheet 1

HUGH E. RIORDAN
INVENTOR.

BY
ATTORNEYS

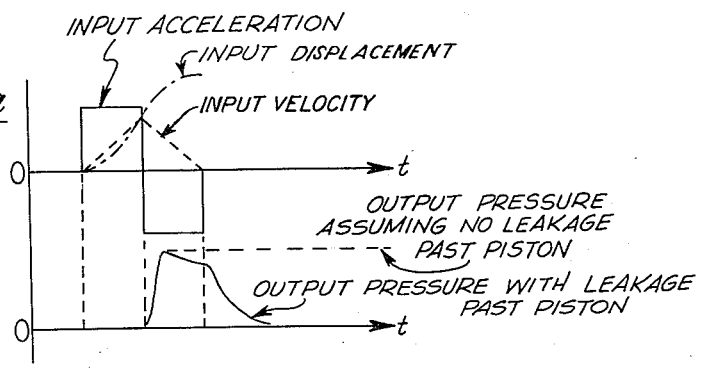
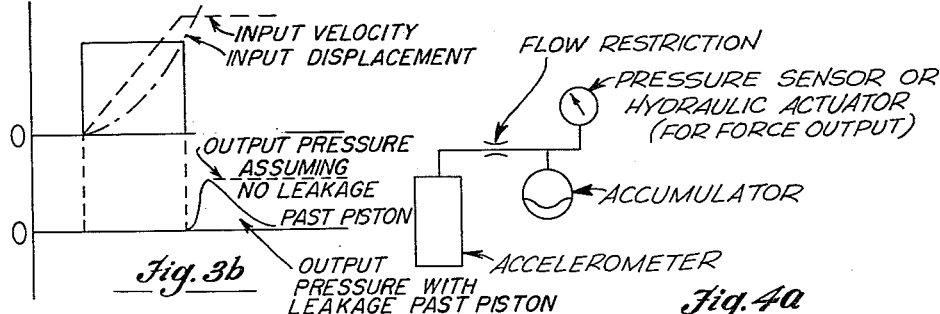
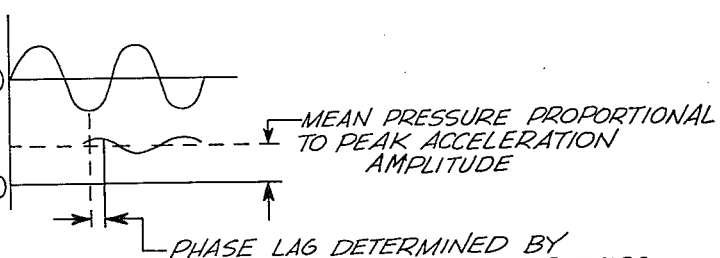
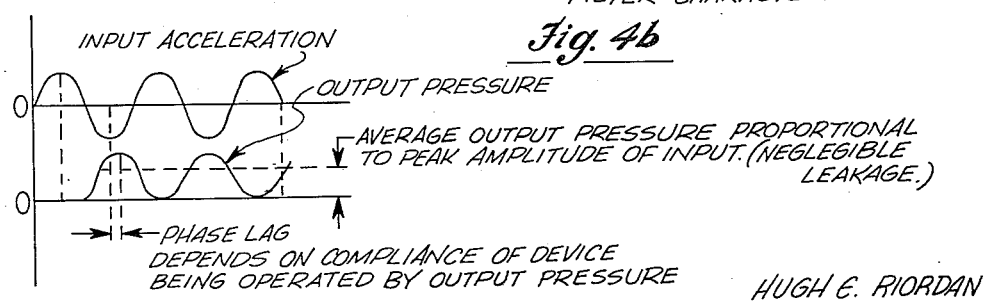

United States Patent Office 3,046,793
Patented July 31, 1962

3,046,793
HYDRAULIC AVERAGING ACCELEROMETER
Hugh E. Riordan, Wyckoff, N.J., assignor to General Precision, Inc., Little Falls, N.J., a corporation of Delaware
Filed Apr. 4, 1960, Ser. No. 19,557
10 Claims. (Cl. 73—515)

This invention relates to accelerometers, and is particularly directed to a hydro-mechanical device, which is used for measuring and determining and averaging accelerations, and for transmitting such acceleration data to another device for speed control and adjustment or for other purposes.

While there is a wide range of accelerometers available, these are usually quite delicate, extremely sensitive, and relatively costly.

Furthermore, most accelerometers, or acceleration measuring devices are devised to measure and indicate instantaneous accelerations, and rates of acceleration, and therefore must be coupled to obtain average or mean acceleration figures as well as velocities.

There is a wide range of applications, both in industrial uses and in aircraft in which it is essential that an average figure for accelerations over an interval of time, as opposed to instantaneous accelerations, is required for various purposes.

Where an accelerometer is used to control the speed of a device or vehicle, the use of instantaneous accelerations involves radical changes in controls which are unsatisfactory for many devices.

It is highly desirable in many installations, even at the sacrifice of some accuracy of measurement and determination, to employ a device which averages out accelerations over a relatively short time interval and transmits these average accelerations as a signal to a speed control device.

It is also highly desirable in installations of this character to dampen the accelerations in order to obtain steps in the change of averages, which are more satisfactory for controlling speed control devices of various types.

The primary feature of the apparatus is that it is mounted in a sealed container, thus protecting it from atmospheric disturbances and corrosion of operating parts, the entire apparatus being mounted in a hollow container, which is filled with a liquid or hydraulic fluid, which serves the dual purpose of damping the moving parts, and serves as a medium for measuring and determining average accelerations.

Because the hydraulic fluid in the cylinder is directly connected to a hydraulic actuator, or other hydraulic control device, the control of the hydraulic actuator or speed control device is direct and positive, no electronic intermediate devices or switches being necessary.

Thus the primary object of the invention is to provide a small, compact averaging accelerometer which can be directly coupled to a hydraulic actuator or other type of speed control device.

Another feature of the device is that it is compact and self-contained, no external connections, except to the output being necessary, no lubrication being necessary at any time.

Another feature of the device is that it is directly hydraulically coupled to a hydraulic actuator, so that no intermediate electronic devices, such as amplifiers, switches and the like are necessary.

Essentially the invention is directed to a hydro-mechanical averaging accelerometer, which is capable of providing a high level mechanical output, proportional either to the R.M.S., or average peak amplitude of an oscillatory acceleration. The device can also be arranged to provide an equivalent electrical output in any desired form by the use of an appropriate pick-off element or elements.

The accompanying drawings, illustrative of one embodiment of the invention, together with the description of its construction and the method of operation adjustment and utilization thereof, will serve to clarify further objects and advantages of my invention.

In the drawings:

FIGURE 3a shows the relation between output pressure plotted against time, for a square wave acceleration input.

FIGURE 3b shows the output pressure response for a square pulse of acceleration.

FIGURE 3c shows the pressure response to a sinusoidal acceleration input with negligible leakage.

FIGURE 4a shows the curves representing a typical filtering arrangement.

FIGURE 4b shows curves representing the resultant response to the filtering arrangement shown in FIGURE 4a.

Figure 1:
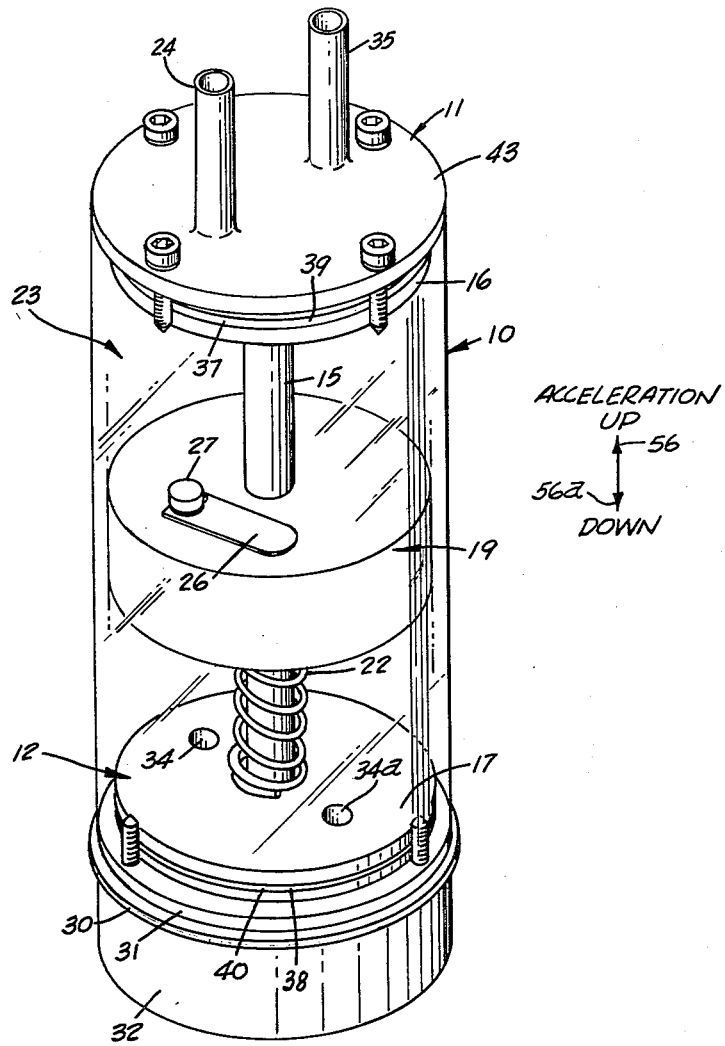
FIGURE 1 is a schematic modified perspective and front elevational view of one embodiment of the averaging accelerometer.

It will be understood that the following description of the construction and the method of support, control, operation and utilization of the hydro-mechanical averaging accelerometer is intended as explanatory of the invention and not restrictive thereof.

In the drawings, the same reference numerals designate the same parts throughout the various views, except where otherwise indicated.

Figure 2:
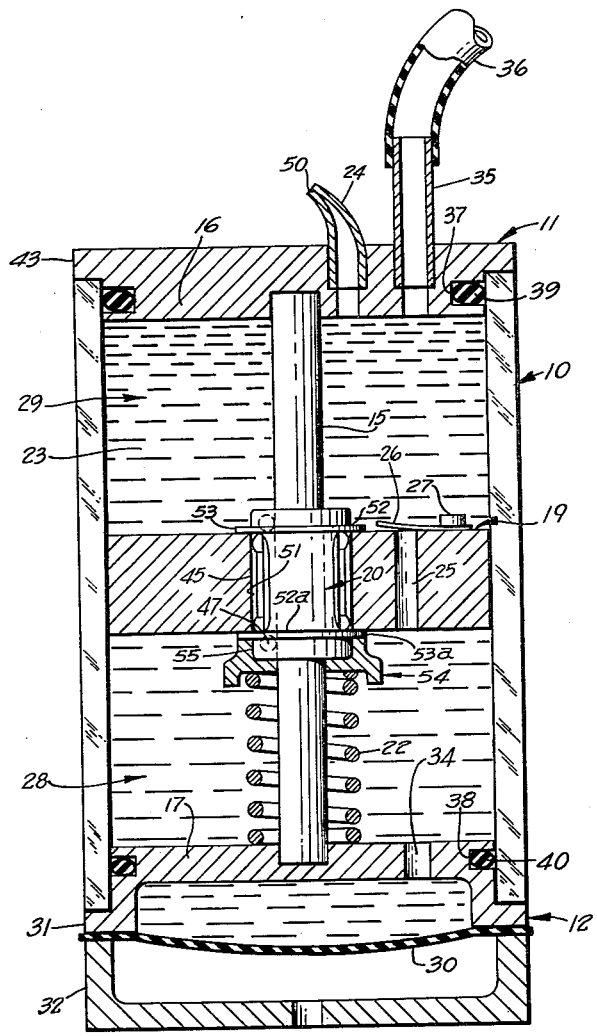
FIGURE 2 is a schematic vertical section through the housing of the averaging accelerometer shown in FIGURE 1.

One embodiment of the construction, shown in FIGURES 1 and 2, is mounted in a hollow tubular housing 10, of circular cross-section, made of a transparent material such as glass, or a metal tube, the ends of which are closed and sealed by a pair of end caps 11, 12, which are fitted to the open ends of the hollow cylinder and attached thereto in a manner hereinafter described.

A substantially cylindrical central support rod 15 is mounted between the inner surface of the cylindrical pilot section 16 of the upper end cap 11, and the corresponding pilot section 17, of the lower end cap 12, the central support rod 15 being co-axial with the hollow housing 10 and fixedly attached to the end caps.

A substantially cylindrical piston 19, which is supported by a linear anti-friction bearing 20, fitted to the central support rod, is mounted on the central support rod, the circumferential outer surface of the piston being reciprocally fitted to the interior of the hollow housing 10.

The linear anti-friction bearing 20 is fitted to the interior of the piston and supported thereby in a manner hereinafter described in greater detail.

A coiled compression spring 22, surrounding the central support rod 15, is interposed between the inner surface of the pilot section 17 of the lower end cap 12 and the bottom surface of the piston 19 or a retainer attached to the lower end of the linear bearing 20 in a manner hereinafter described.

The compression spring 22 is operative to normally center the piston so that the volume of fluid between the upper surface of the piston 19 and the bottom surface of the pilot section 16 of the upper cap, and that between the bottom surface of the piston and the upper surface of the pilot section 17 of the lower end cap 12 are normally equal when the apparatus is at rest, or the acceleration zero.

The entire interior of the hollow housing is filled with a hydraulic fluid 23, or other type of liquid or fluid, the fluid being supplied through a tubular filler tube 24, attached to the upper end cap 11 and extending upward therefrom and which is sealed off after filling.

The body of the piston has an opening 25 therethrough, which is normally sealed by a flapper valve 26, one end of which is attached to the upper face of the piston 19 by a screw 27, or other suitable attaching means.

The operation of the flapper valve 26 is hereinafter described in greater detail.

The type of hydraulic fluid used and the viscosity thereof would be determined by the degree of damping required in a particular installation and the ambient operating temperature.

The size and weight of the cylindrical piston 19, and the material of which it is made would be determined by the degree of acceleration for which the particular apparatus is designed, and the magnitude of output required.

The load capacity of the compression spring 22 would be determined by the weight of the piston, and the degree of acceleration for which a particular apparatus is designed.

A thin elastomeric circular diaphragm 30, which is made of rubber or other highly extensible material, is stretched between the cylindrical head 31 of the lower end cap 12 and a substantially cylindrical base 32, which is mounted below the lower end cap 12, the cylindrical base 32 supporting the assembled apparatus.

A plurality of openings 34, 34a are formed through the upper wall of the pilot section 17 of the lower end cap 12, to provide communication between the area in the interior of the cylindrical housing 10, below the bottom of the piston, and the space in the interior of the lower end cap 12, between the top wall of the pilot section thereof and the diaphragm 30.

A tubular outlet 35 is provided at the upper end of the upper end cap 11, a flexible tube 36 which is attached to the tubular outlet, being connected to the inlet end of a hydraulic actuator or pressure sensor, the flexible tube being normally filled with hydraulic fluid.

After the entire interior of the cylindrical housing is filled with hydraulic fluid of the proper viscosity, the inlet tube 24 may be sealed by means of a cap, by pinching the end thereof or by other suitable means, thus preventing discharge of the hydraulic fluid through the inlet tube.

In order to seal the area between the pilot sections 16, 17 of the end caps 11, 12, and the interior of the tubular housing 10, a groove 37, 38 of rectangular or other suitable cross-section may be cut into the outer circumference of each of the pilot sections 16, 17 of the end caps 11, 12, an O ring 39, 40 or other type of seal ring being inserted in each of the grooves 37, 38, to seal the interior of the housing 10.

The upper end cap 11 may be attached to the upper end of the tubular housing 10, by a plurality of hollow-hexagon, or other type of headed screws 42, each of which is inserted through an opening through the flat cylindrical head 43 of the upper end cap, the body of the screw being threadably fitted to the wall of the tubular housing 10.

The lower end cap 12 is similarly attached to the bottom of the tubular housing 10 by a plurality of counter-sunk head, or other type of screws 44, which are inserted through the head 31 of the lower end cap, the screws being similarly threadably fitted to the outer wall of the tubular housing 10.

FIGURE 2 is a schematic vertical section through the averaging accelerometer shown in FIGURE 1.

The linear ball bearing 20 is shown at the center of the piston 19, surrounding the central rod 15.

The piston has a circular opening 45, through the center thereof.

The linear bearing comprises a plurality of longitudinal rows of balls 47, inserted in the circular opening 45, the rows of balls being separated by a continuous tubular longitudinal separator to retain the balls in the position shown in FIGURE 2.

As shown in FIGURE 2, the linear ball bearing 20 is inserted through a cylindrical opening through the center of the piston 19.

Extensions of the outer ring 51 of the linear bearing have a pair of grooves 52, 52a of rectangular cross-section therethrough, near the ends of the linear bearing. A pair of snap-rings 53, 53a are inserted into the grooves 52, 52a to align the linear bearing 20 relative to the piston 19, each snap ring abutting one end of the piston 19.

As shown in FIGURE 2, a spring retainer 54, is fitted to the cylindrical extension 55, at the lower end of the outer ring of the linear bearing 20, the cupped end of the retainer being fitted around the projecting portion of the extension of the bearing ring and pinned, or otherwise fixedly attached to the bearing ring.

The lower portion of the retainer engages the upper end of the compression spring 22.

FIGURE 2 also shows the inlet tube 24 crimped or otherwise sealed 50, at the upper end thereof.

The operation of the device is substantially as follows:

The averaging accelerometer is mounted on the movable portion of a vibrating object, the degree of vibration of which is to be controlled, or the acceleration of which is to be measured or recorded.

Mounting means may be attached to the base 32 of the accelerometer, or straps or other suitable support means attached to the tubular housing 10, to support the apparatus. In mounting the apparatus, the longitudinal axis of the cylindrical housing is axially aligned with, or parallel to the principal axis of vibration, where the vibration is in one direction, or in which the vibration control means operates in one direction.

When the vibrating member is vibrated along multiple axes, the vibration along each axis being controlled by a separate hydraulic actuator, or by a multi-directional hydraulic actuator, a plurality of averaging accelerometers may be attached to the same unit, the longitudinal axis of each cylindrical housing being aligned with the particular axis of vibrating movement.

As an example, the direction of vibration acceleration may be considered as up and down depending upon whether the acceleration vector, arrows 51, 51a, FIGURE 1, is directed toward the top or bottom of FIGURE 1.

When the direction of the accelerating force is up, the tubular housing 10 is moved upward with the body to which it is attached. The inertia caused by the weight of the piston 19, causes the piston to tend to stay in its initial position, or at least lag behind the upward movement of the tubular housing 10.

This causes the height of the lower compartment 28, between the top of the pilot section 17 of the upper end cap and the bottom of the piston 19 to be reduced, and as the hydraulic fluid 23 is relatively incompressible, causes a portion of the hydraulic fluid to pass upward through the opening 25, through the piston, thence by the flapper valve 26, until the hydraulic pressure is equalized between the lower cylindrical compartment 28, and the upper cylindrical compartment 29 of the housing cylinder, above the piston 19. Due to the reduced height of the lower cylindrical compartment, the compression spring 22 is compressed somewhat, until the combination of the weight of the piston, working against the spring pressure, and the pressure on the hydraulic fluid in the lower cylindrical compartment, balances the fluid pressure in the upper cylindrical compartment 29.

When the force of the acceleration is downward, in the direction of the lower arrow 51a, the flapper valve 26 remains closed due to the pressure of the hydraulic fluid above it. Because of the relative incompressibility of the hydraulic fluid in the housing, and as there is no means provided for transferring hydraulic fluid from the upper cylindrical compartment 29 to the lower cylindrical compartment, the piston moves with the hollow cylinder while the apparatus is accelerated.

Under conditions of oscillating acceleration, the operation of the device is divided into two steps. During the upward component of the oscillating acceleration, the cylinder moves upward relative to the piston, thereby compressing the spring and causing some hydraulic fluid to pass through the flapper valve to the upper cylindrical compartment.

When the vibration cycle is reversed, and the hollow cylinder starts to move downward, the piston tends to normally move downward with the cylinder. However, as the spring is compressed, there is a tendency for the compression load within the spring to force the piston upward, thereby raising the fluid pressure in the upper fluid compartment, the increased fluid pressure being transmitted to the hydraulic actuator, through the outlet tube 37. This increased fluid pressure through the tubular outlet 37 can be employed to operate an indicator, or to adjust a speed or amplitude control device, which is controlled by the actuator, or perform any other desired function.

Where the range of oscillating vibration is relatively small, a hydraulic amplifying device may be connected to or built into the hydraulic actuator, or an electrical signal device may be connected to the hydraulic actuator, the electrical signal being amplified by electronic or other suitable means to amplify the force to enable it to perform any desired function.

Thus during oscillating acceleration, assuming substantially the same degree of acceleration in both directions, a signal is transmitted to the hydraulic actuator during one phase of the cycle.

Assuming an accurate fit between the inner surface of the hollow cylinder 10 and the piston 19, or the use of relatively frictionless seal means, such as thin piston rings, there would be little or no leakage past the piston, therefore any pressure rise generated in the upper cylindrical compartment 29 would be retained therein. Thus the mechanism would provide an information storage function.

If a controlled leak is provided, the mean output pressure will be a function of the average of the absolute value of the acceleration, and can therefore be used for continuous control. In this case, the gain and time constant of the output pressure function will be determined by the following parameters:

(1) Piston mass.
(2) Piston circular area.
(3) Degree of spring stiffness, and maximum travel of upper end of compression spring relative to bottom thereof.
(4) The size of the controlled leak.

The function of the elastic membrane, or diaphragm 30 is to provide a reservoir of fluid to accommodate the volume displacement of the hydraulic actuator, or indicator used in conjunction with the averaging accelerometer.

The basic function of the apparatus is substantially as follows:

The device is conceived as a simple means of measuring peak, average or R.M.S. values of periodic and transient oscillations.

The primary output is an hydraulic pressure, although mean piston position can also be used as an indicating means.

The detailed fundamentals of the operation of the device are given in conjunction with the drawing figures, which have been added to and made part of the drawings filed with the application.

The device is in effect, a hydromechanical rectifier coupled with a conventional spring mass accelerometer. Coupling of these two basic mechanisms is accomplished in a novel and simple manner in such a way as to result in an entirely new solution to the problem of providing a high unidirectional force or pressure which is a known function of acceleration. In order to better understand how the device functions, the response to three types of acceleration input is shown in FIGURES 3a, 3b, 3c.

Reduction in the amplitude of the pulsations appearing in the response to a sinusoidal input can be accomplished, as is pointed out in the specification, by connecting appropriate filtering means to the output of the instrument. The character of the filtering means will determine whether the mean output pressure is proportional to the average peak input amplitude or to some other function, such as the R.M.S. or average value of the absolute input amplitude, and will also determine the amplitude of the pressure fluctuations superimposed on the mean value of the output pressure.

A typical filtering arrangement is shown in FIGURE 4a, together with the resultant response which is shown in FIGURE 4b. This filter is a simple resistance-capacitance attenuator having the transfer function $$\frac{P}{P1} = \frac{1}{Ts+1}$$

where T is a time constant determined by the sizes of the flow restriction and the accumulator and $s$ is the Laplace variable.

By providing a calibrated leak past the piston of the accelerometer in addition to the type of filtering means shown in FIGURE 4, the accelerometer output pressure can both be smoothed and scaled to give a steady state component proportional to the R.M.S., absolute average, or other ratio or percentage of the input acceleration.

FIGURE 3a shows the relation between output pressure plotted against time, for a square wave acceleration input. It will be noted that the output pressure is either a constant, proportional to the input amplitude where there is no leakage, or in the form of a positive pulse for each square wave cycle, where there is some leakage.

FIGURE 3b shows the output pressure response for a square pulse of acceleration. Again the output is a steady pressure in the case of no leakage, or a pulse if leakage is present.

FIGURE 3c shows the pressure response to a sinusoidal acceleration input with negligible leakage. The output is seen to be a sinusoidal pressure displaced from zero by an amount equal to the pressure amplitude, and lagging the output acceleration sinusoidal curve by an amount dependent on the compliance of the device being operated by the output pressure.

In its applications, the averaging accelerometer can be utilized in a variety of ways.

The device can be applied to direct control of machines or processes of various types, or used for direct measurement or telemetry, where extreme simplicity, ruggedness and high output are desired.

As an example of one type of operation for a machine, or process control, an output of up to 200 pounds force over a stroke up to 1 inch can be provided with an input of 10 gravity units peak, at approximately 10 cycles per second. In such an application, no external electrical, mechanical, or pneumatic power supply is required by the apparatus, nor are there any computors, networks or other auxiliary equipment required.

This represents a substantial improvement over other types of accelerometers, in which several auxiliary devices are required to compute, amplify and transmit to other pieces of apparatus, the readings taken by the accelerometer.

In this apparatus, the energy in the motion being measured by the device is converted directly by the apparatus proper into hydraulic pressure which may be used to operate and control any type of hydraulic actuator, either adjoining the apparatus, or at a point remote therefrom, or to operate a visual or electrical indicator.

In actual operation, the averaging accelerometer is mounted on the moving device in the vibrator system, which is to be controlled, or the acceleration of which is to be measured. The longitudinal axis of the cylindrical housing is aligned with the principal axis of vibration, or where the vibration is along several axes simultaneously, there may be several accelerometers mounted, as in the conventional type of aircraft navigation platform, the longitudinal axis of the housing of each accelerometer being mounted in alignment with one axis of vibration.

In applications requiring a high degree of precision over a wide range of temperatures, compensation for variations in fluid viscosity with temperatures can be provided by using a temperature controlled, variable geometry orifice, or orifices for the leak.

Leakage between the piston periphery, and the inner surface of the tubular housing can be held to a negligible amount by accurate machining, polishing and finishing of both parts and selective fitting of piston to cylinder, and by holding both parts to extremely close tolerances and fine surface finishes. In some instances one or more thin low pressure piston rings may be fitted to grooves in the piston, to further control leakage.

In installations in which weight is an important factor, or where temperature is a critical factor, an inert gas, such as nitrogen may be used as a working fluid instead of the hydraulic fluid.

Various improvements and attachments can be added to the device to improve its accuracy, or expand its range of operation.

These include:

Two convenient means of providing an output reading on the hydraulic averaging accelerometer include the measurement of the pressure of the fluid at the outlet end, and the measurement of the mean position of the piston at any point in its stroke.

This can be obtained by means of a visual indicator, or an electrical pick-off device, which would indicate either the momentary position of the piston, or the range of movement thereof under conditions of vibration.

Potentiometers or inductive or capacitive pick-offs can readily be used to measure momentary piston position and determine mean piston position.

These devices can be incorporated as an integral part of the apparatus, and connected to an external indicating device.

The use of a hydraulic actuator, a visual or electrical pressure gauge located remotely from the device, can of course be readily arranged by providing a flexible tube 38 from the outlet tube 37 of the hydraulic accelerometer to the output device.

Since both piston range and output pressure contain oscillating components, superimposed on the steady output, and mean piston position, and since such oscillating components may be objectionable in some installations, two methods of filtering the output for eliminating the effects of these oscillating components have been investigated. These include hydraulic and electrical devices and combinations thereof.

Since it is extremely difficult, if not almost impossible to smooth out piston fluctuations, electrical outputs, based on momentary piston position, and mean piston position can in most instances be adequately filtered by a simple second order network, connected into the circuit at the point at which the signal appears as a D.C. current.

Fluctuations in fluid pressure output are readily filtered by means of a series orifice and shunt accumulator, which may be made an integral part of the hydraulic accelerometer, or if preferred located remotely therefrom. Second order filtering may be provided, where required, by proper proportioning of the orifice and the line.

It will be apparent to those skilled in the art, that the present invention is not limited to the specific details described above and shown in the drawings, and that various modifications are possible in carrying out the features of the invention and the operation and the method of support, mounting and utilization thereof, without departing from the spirit and scope of the appended claims.

What is claimed is:

1. An averaging accelerometer comprising a hollow substantially cylindrical housing, a pair of end caps adapted to seal the ends of the hollow housing, fixedly attached to the hollow housing, a substantially cylindrical piston reciprocally fitted to the hollow housing, concentrically therewith, means co-axial with the cylindrical housing adapted to slidably guide the piston, compressible means fitted to one end of the piston between the piston and one end cap adapted to normally urge the piston toward the opposite end cap, a hydraulic fluid substantially filling the interior of the hollow housing, between the end surfaces of the piston and the corresponding surfaces of the end caps, said piston having an opening therethrough, substantially parallel to the reciprocating axis of the piston, and valve means attached to the piston adjacent said opening, the valve means being adapted to permit hydraulic fluid to flow through said opening in one direction, while preventing the flow of hydraulic fluid through said opening, in the opposite direction, said piston having a controlled leak opening therein, means adapted to supply hydraulic fluid to one end of the hollow housing, and means adapted to permit hydraulic fluid to be exhausted from said hollow housing.

2. An averaging accelerometer comprising a substantially tubular open-ended housing, means adapted to seal the open ends of the tubular housing, a substantially cylindrical piston reciprocally fitted to the interior of the housing, means co-axial with the housing adapted to slidably guide the piston, a hydraulic fluid substantially filling the interior of the tubular housing, between the piston and the sealed ends of the housing, said piston having an opening therethrough, substantially parallel to the reciprocating axis of the piston, and valve means attached to the piston adjacent one end of said opening, said valve means being adapted to permit hydraulic fluid to flow through said opening in one direction, while preventing the flow of hydraulic fluid, through said opening, in the opposite direction, said piston having a controlled leak opening therein, compressible means incorporated between the piston and one sealed end of the tubular housing, adapted to normally urge the piston toward the end of the housing opposite the compressible means, means adapted to supply hydraulic fluid to the interior of the housing, and means adapted to permit hydraulic fluid from the interior of the housing to be evacuated.

3. An averaging accelerometer as in claim 2, in which the means reciprocally supporting the piston is a substantially cylindrical support rod, co-axial with the tubular housing and extending through the clear portion of the housing, between the sealed ends thereof, said support rod being fixedly attached to the seal means at the ends of the housing.

4. An averaging accelerometer, as in claim 2, in which the means reciprocally supporting the piston, is a substantially cylindrical support rod, co-axial with the piston, said support rod being fixedly attached to the seal means at the ends of the tubular housing, and a linear anti-friction bearing fitted to the piston and surrounding the support rod, said anti-friction bearing being adapted to slidably engage the support rod.

5. An averaging accelerometer, as in claim 2, in which the means sealing the ends of the tubular housing is a pair of end caps, each of said end caps having compressible means fitted thereto, adapted to seal one end of the housing.

6. An averaging accelerometer, as in claim 2, in which the means sealing the ends of the tubular housing is a pair of end caps, each of said end caps having compressible means fitted thereto adapted to seal one end of the housing, the means reciprocally guiding the piston being a substantially cylindrical support rod co-axial with the tubular housing, and extending through the housing over the entire open length thereof, the ends of the support rod being fixedly attached to the end caps, the compressible means adapted to engage one end of the piston being a coiled compression spring surrounding the support rod, the compression spring being in normal engagement with one end of the piston and the corresponding end of one of the end caps, the compression spring being adapted to normally urge the piston toward the end cap, opposite the end cap in engagement with one end of the compression spring.

7. An averaging accelerometer comprising a substantially tubular, open-ended housing, a pair of end caps fixedly attached to and adapted to seal the open ends of the tubular housing, a substantially cylindrical piston reciprocally fitted to the interior of the tubular housing, co-axially therewith, a substantially cylindrical support rod, concentric with the housing fitted through the piston, said piston having an opening therethrough, substantially parallel to the axis of the cylindrical support rod, and slidably guiding the piston, a hydraulic fluid substantially filling the interior of the tubular housing, between the piston and the end caps attached to the tubular housing, a flapper valve fitted to one end of the piston, adjacent one end of the opening therethrough, means attaching a portion of the flapper valve to the piston, the flapper valve being adapted to permit the flow of hydraulic fluid through the piston opening in one direction, while preventing the flow of said hydraulic fluid through said piston opening in the opposite direction, said piston having a controlled leak opening therein, compressible means incorporated between the piston and the end cap attached to one end of the housing, adapted to normally urge the piston toward the end cap, opposite the end cap in engagement with the compressible means, means adapted to supply hydraulic fluid under pressure to the interior of the housing, and means adapted to permit hydraulic fluid from the interior of the housing, to be evacuated therefrom.

8. An averaging accelerometer, as in claim 7, in which the end cap to the housing, adjacent the compressible means, has an integral end wall, directed toward the interior of the housing, said end wall having a plurality of openings therethrough, the interior of the end cap between the end wall of the end cap, and the outer end thereof having a hollow cavity therein, a diaphragm made of a compressible material, fixedly mounted adjacent the end of the end cap, opposite the end wall thereof, said diaphragm being directly in contact with the hollow cavity through the end cap, the hydraulic fluid being adapted to flow through the openings through the end wall of the end cap, to normally fill the cavity between the end wall of the end cap and the flexible diaphragm.

9. An averaging accelerometer, as in claim 7, in which the means adapted to supply hydraulic fluid to the tubular housing is a fluid inlet tube fixedly attached to the end cap, said inlet tube being located opposite the compressible means, said inlet tube extending through the end cap, in communication with the interior of the tubular housing.

10. An averaging accelerometer, as in claim 7, in which the means adapted to permit evacuation of the hydraulic fluid from the tubular housing, is a tubular outlet fixedly attached to the end cap located opposite the compressible means, the tubular outlet being in communication with the interior of the tubular housing, and flexible tubular means attached to the tubular outlet for conveying the hydraulic fluid from the housing to an external point.

References Cited in the file of this patent
UNITED STATES PATENTS

| | | |
|---|---|---|
| 2,386,777 | Bentley | Oct. 16, 1945 |
| 2,752,466 | Bonnell | June 22, 1956 |
| 2,831,670 | Bourns et al. | Apr. 22, 1958 |
| 2,945,378 | Martin | July 19, 1960 |

FOREIGN PATENTS

| | | |
|---|---|---|
| 46,402 | Austria | Feb. 10, 1911 |